US006258883B1

(12) United States Patent
Ebner et al.

(10) Patent No.: US 6,258,883 B1
(45) Date of Patent: Jul. 10, 2001

(54) OXYGEN SCAVENGING SYSTEM AND COMPOSITIONS

(75) Inventors: Cynthia Louise Ebner, Greer, SC (US); John Scott Hallock, Potomac, MD (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/306,401

(22) Filed: May 6, 1999

(51) Int. Cl.$^7$ ....................................................... C08K 3/10
(52) U.S. Cl. .............................................. 524/413; 524/434
(58) Field of Search .................................... 524/413, 434

(56) References Cited

U.S. PATENT DOCUMENTS

| | | | |
|---|---|---|---|
| 4,529,740 | 7/1985 | Trainor | 521/84 |
| 4,536,409 | 8/1985 | Farrell et al. | 426/398 |
| 4,675,356 | 6/1987 | Miyata | 524/424 |
| 5,075,362 | 12/1991 | Hofeldt et al. | 524/72 |
| 5,284,871 | 2/1994 | Graf | 514/499 |
| 5,346,644 | 9/1994 | Speer et al. | 252/188.28 |
| 5,399,289 | 3/1995 | Speer et al. | 252/188.28 |
| 5,399,329 * | 3/1995 | Schutz et al. | 423/415.1 |
| 5,498,364 | 3/1996 | Speer et al. | 252/188.28 |
| 5,507,980 | 4/1996 | Kelker et al. | 264/15 |
| 5,529,833 | 6/1996 | Speer et al. | 428/215 |
| 5,648,020 | 7/1997 | Speer et al. | 252/188.28 |
| 5,834,079 | 11/1998 | Blinka et al. | 428/35.7 |
| 5,941,037 * | 8/1999 | Hallock et al. | 524/407 |
| 5,977,212 * | 11/1999 | Ebner et al. | 523/210 |
| 5,985,169 | 11/1999 | Miller et al. | 252/188.28 |
| 6,086,786 | 7/2000 | Blinka et al. | 252/188.28 |

* cited by examiner

Primary Examiner—Kriellion Sanders
(74) Attorney, Agent, or Firm—Mark B. Quatt

(57) ABSTRACT

An oxygen scavenging system and composition capable of providing good oxygen absorption activity and capabilities, wherein the system comprises a modified anionic hydrotalcite particulate material and a transition metal ion source.

20 Claims, No Drawings

US 6,258,883 B1

OXYGEN SCAVENGING SYSTEM AND COMPOSITIONS

FIELD OF THE INVENTION

The present invention relates to a novel oxygen scavenging system and resultant compositions that can be used to retain product quality and improve shelf life of oxygen sensitive materials. The subject compositions can be formed into shaped structures, e.g., films, coatings, 3-dimensional solids, fibers, webs and the like, as well as to shaped products into or onto which said compositions or structure are incorporated, applied to or be made part of a container structure.

BACKGROUND OF THE INVENTION

The present oxygen scavenging system comprises a modified anionic hydrotalcite-like particulate in combination with a transition metal ion or a source for said ion. It may be formed into a composition composed of said system in a carrier which permits the system to combine with oxygen when in the presence of moisture. Specifically, the composition utilizes modified anionic hydrotalcite-like particulates which have certain anionic groups and a transition metal ion or source for said ion, as fully described herein below. The particulate containing oxygen scavenging composition of the present invention has unexpectedly been found to provide effective absorption of oxygen from the interior of a container without adversely affecting the color, taste or smell of the packaged products contained therein which is normally associated with conventional agents and/or oxidation by-products thereof.

The subject oxygen scavenging system and the resultant composition have been found to provide high scavenging activity and capacity. The resultant composition has the ability to effectively chemically combine with oxygen, such as from the interior of a container, without undue migration of the components of the oxygen scavenging system or their oxidation by-product(s) out of the composition's matrix. The inhibition of migration is of particular advantage in that it significantly reduces or eliminates adverse effects on the color, taste, or smell of articles in contact with the composition as well as provides a means of using high levels of scavenging components while meeting government regulations directed to amounts of extraneous material permitted in food products.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container or its closure means.

It is known to include an oxygen scavenger agent in sheet material. The oxygen scavenger agent reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid or end portion. It has long been recognized that when conventional containers of these types are used for the storage of oxygen sensitive materials, the shelf life of the stored materials is very limited. The quality of the packaged material tends to deteriorate over time, in part because dissolved oxygen typically is present in the package from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It is desirable to extend the shelf-life of packaged products using materials capable of being fabricated into or as part of a film, liner material, closure, gasket or other member of a package intended for storage of oxygen sensitive products.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate. In the presence of moisture, the salts and iron tend to migrate into liquids, producing off-flavors. Similarly, U.S. Pat. No. 4,536,409 issued to Farrell et al. recommends potassium sulphite as a scavenger, with similar results.

It is known in the art that ascorbate compounds (ascorbic acid, its alkali metal salts, optical isomers, and derivatives thereof) as well as sulfites, bisulfites, phenolics, etc. can be oxidized by molecular oxygen, and can thus serve as an oxygen scavenging material. For example, U.S. Pat. No. 5,075,362, issued to Hofeldt et al., discloses the use of ascorbate compounds in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. Copper ascorbate is used in the examples. The reference indicates that relatively high level of $Cu^{2+}$ (~5 ppm) are required in the food for scavenging to be effective but indicates that small amounts of the $Cu^{2+}$ may combine with oxygen in food to cause food spoilage. In order to avoid spoilage, one is required to reduce the amount of headspace $O_2$ or partially flush the container with an inert gas (Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts.

In each of the above references, the active component of the oxygen scavenging systems utilized agents which readily transfer into the food or other packaged product or materials or which produce oxidation by-products which are known to adversely affect a wide range of packaged material.

Hydrotalcite is a naturally occurring mineral commonly classified as a clay. Generally speaking, clays break down into broad groups of being cationic materials which are commonly found in nature or anionic materials, which is rarely found in nature. These materials are used in a wide range of applications, such as industrial absorbents, catalysts, fillers, decolorizing agents and the like. Naturally occurring hydrotalcite are hydroxide-carbonate minerals of the formula $$Mg_6Al_2(OH)_{16}CO_3 \cdot 4H_2O$$

It is well known that the hydrotalcite mineral is strongly bonded to the carbonate. The carbonate may be driven off by thermal calcination.

Recently, hydrotalcites with anions other than carbonate have been synthesized. They are generally layered double hydroxides (LDH) which include anionic hydrotalcite-like compounds (HTLC). They have been described in U.S. Pat. Nos. 5,399,329 and 5,507,980 as well as by W. T. Reiche in Chem Tech (1986) 58–63, the teachings of which are incorporated herein in their entirety by reference. These new materials have anions in its crystal structure which are easily exchanged.

It is highly desired to provide an effective oxygen scavenging system and composition which have high oxygen absorption rate and capacity.

It is further desired to provide an oxygen scavenging system and composition which are capable of inhibiting the release of oxidation by-product(s) which may adversely effect the color, taste or smell of the packaged material.

It is further desired to provide an effective oxygen scavenging composition which has the active scavenger system contained within a carrier and the system still provides a high oxygen absorption rate and capacity.

It is further desired to provide an effective oxygen scavenging system which is thermally stable and, thereby, capable of allowing the packaging system to be formed and processed by conventional techniques which include elevated temperature processing steps.

It is still further desired to provide an effective oxygen scavenging system and composition which has the system contained within a carrier suitable for forming at least part of a package or container which enhances the storage stability of oxygen-sensitive articles contained therein.

SUMMARY OF THE INVENTION

The present invention is directed to a composition comprising a carrier having uniformly distributed therein an oxygen scavenging system capable of exhibiting high initial oxygen scavenging activity and enhanced oxygen scavenging capacity while avoiding undue migration of the components of the composition and its oxidation by product(s) from the carrier. The inhibition to migration significantly reduces or eliminates adverse effects of color, taste and smell of packaged articles which are in contact with or contained in a container having said composition. Specifically, the present composition comprises a carrier having a combination of a modified anionic hydrotalcite-like material and a transition metal ion source, as fully described herein below.

The present invention is further directed to shaped structures containing or derived from the subject composition. Such structures can comprise one or more layers of a film suitable for forming a closed package (e.g., pouch) as well as semi rigid or rigid containers, including closures, such as closure sealants, closure gaskets, fluid-applied sealant compositions (e.g., melt-applied crown cap gasket compositions), cap liner discs, and the like, formed with or containing the subject composition.

DETAILED DESCRIPTION

The present invention is directed to an oxygen scavenging composition comprising a carrier having uniformly distributed therein an effective oxygen scavenging system comprising a modified anionic hydrotalcite-like material and a transition metal ion source distributed therein, as fully described herein below.

The present invention further provides an improved container for packaging materials, such as food, beverages and the like, which are susceptible to oxidative degradation. The present improved container is capable of retaining product quality and enhanced shelf life of the packaged material without adversely affecting the color, taste or smell of the packaged material by the present oxygen scavenging composition. It further provides a packaging system which can have high levels of oxygen scavenger agent therein while meeting government regulatory standards related to amounts of such agents contained in food products.

The term "system", as used herein and in the appended claims, refers to active oxygen scavenging agents comprising at least one modified anionic hydrotalcite-like material in combination with at least one transition metal ion source. The transition metal ion source may be present as a transition metal compound which forms a substantially homogeneous mixture with modified anionic hydrotalcite-like material; or as a transition metal compound coated on the surface of the modified anionic hydrotalcite-like particulate material; or as transition metal ions substituted for at least a portion of the non-transition metal ions, $M^{II}$ and even $M^{III}$, of the modified anionic hydrotalcite particulate material; or a combination thereof.

The term "composition" as used herein and in the appended claims refers to the active oxygen scavenging agents comprising the system and a carrier component. The carrier can be a polymer matrix in which the particulate material forming the subject oxygen scavenging system is substantially uniformly distributed, or a film or mat (woven or non-woven) having the particulate material substantially uniformly distributed therein or deposited thereon, or a moisture permeable pouch or sachet which contain the subject particulate material distributed therein.

The anionic hydrotalcite-like material which is a component of the oxygen scavenger system of the present invention has the general formula:

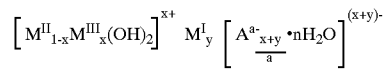

wherein $M^{II}$ represents magnesium (preferred), calcium, zinc, nickel, copper or cobalt or mixtures thereof in their plus 2 valence state, $M^{III}$ represents aluminum (preferred), chromium, or iron or mixtures thereof in their plus 3 valence state. In certain instances the present HTLC may further contain cations $M^I$ which represents an alkali metal cation selected from sodium (preferred), potassium or mixtures thereof having a plus 1 valence state. $M^I$ may be present, when "a" (as defined below) has a value of at least 2, in a molar amount y equal to a value of from 0 to about 0.5. The molar ratio of $M^{II}$ to $M^{III}$ is from 1 to 5; OH represent hydroxyl groups; x has a numerical value of from about 0.1 to 0.5; and n has a numerical value of from 0 to 4 and generally from 1 to 4.

The symbol A of the above formula represents, at least in part, an oxygen scavenger group containing anion. Such oxygen scavenger group containing anion may be, for example, inorganic anions such as bisulfite, dithionite and the like which are capable of reacting with oxygen or organic anions such as, for example, ascorbates, thiolates or phenolates and the like which are capable of reacting with oxygen. The remainder of the anion A being residual anion of the precursor HTLC, as fully described herein below. The anion A should be at least about 60 mole %, preferably at least about 80 mole % and most preferably at least about 90 mole % in the form of the oxygen scavenging inorganic or organic anions described above with the remainder being residual anions of the original hydrotalcite and/or other anions. The symbol "a" of the above formula represents the numerical value of the valence of the anion A. For example, the value of "a" for a dithionite anion is 2 while the value of "a" for the bisulfite, ascorbate or phenolate is 1. The value of "a" for the residual anion will depend on the identity of the anion and, in general, will have a value of from 1 to 3.

In general, when the subject modified anionic hydrotalcite-like material has anions A which predominately represents monovalent anions, such as bisulfite, phenolate or ascorbate, as described above, or is formed in a manner which does not yield $M^I$ as part of the resultant product, the subject oxygen scavenger agent of the present invention can be represented by the general formula:

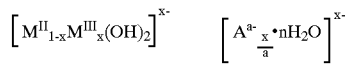

wherein each symbol is the same as defined above.

The term "ascorbate anion" as used herein and in the appended claims refers to the deprotonated species of ascorbic acid in either its D or L form and any derivative, or analog thereof, including, for example, erythorbic acid and mixtures thereof. It is preferred that the ascorbate anion be selected from the deprotonated species of D- or L- ascorbic acid, or fatty acid derivatives of ascorbic acid as well as mixtures thereof.

The term "phenolate anion" as used herein and in the appended claims refers to (i) deprotonated hydroxyl group containing aromatic ring or condensed aromatic ring compound. Examples of phenolic compounds from which the phenolate anion can be derived include phenol, pyrocatechol, recorcinol, pyrogallol, pyrochatechol monoethyl ether, resorcinal monoethyl ether, hydroquinone, 1,2, 4-trihydroxybenzene, tetrahydroquinone, 2,4-dibutylphenol and the like; or (ii) hydroxyl group containing aromatic ring or condensed aromatic ring compounds which further contain a deprotonated carboxylic acid group such as salicylate anion, 3-hydroxy benzoate, 4-hydroxy benzoate, 3,4,5-trihydroxybenzoate and the like.

The term "hydrotalcite-like" is a recognized term in the art (See Cavani et al, Catalyst Today 11 173 1991) and is used herein in a manner consistent with such usage.

The subject modified anionic hydrotalcite-like materials can be formed by a variety of means. In one instance, an anionic HTLC having a labile anion can be used as the precursor in forming the present material. The anion of the precursor anionic hydrotalcite-like material should be sufficiently labile to be readily exchanged with the oxygen scavenger anion. HTLC having lower alkanoic acid anions, such as a $C_1-C_5$ monocarboxylic acid anion (e.g., anions of formic, acetic, propionic, or butyric acid or the like) is a preferred anionic HTLC to be used as the precursor material. The formation of such precursor material is disclosed in U.S. Pat. No. 5,399,329, the entire teachings of which are incorporated herein by reference. The present oxygen scavenging anionic hydrotalcite-like component of the subject system is formed by anion exchange of the above-described precursor material, in the absence of oxygen, with alkali metal or akaline earth metal salts of an oxygen-scavenger anion, described herein above.

Alternately, the subject modified anionic hydrotalcite-like material can be formed by reacting, in the absence of oxygen, either the salt or conjugated acid (protonated form) of at least one of the subject oxygen scavenger anions with HTLC having carbonate anions. The reaction may be carried out in deoxygengated water as the reaction media. The reaction product is washed with deoxygenated water in the absence of atmospheric oxygen to produce a water insoluble oxygen scavenger active material of the present invention.

Still another manner of forming the subject modified anionic hydrotalcite-like material utilizes previously calcined hydrotalcite. The calcined hydrotalcite without associated anions can be reacted with conjugate acids of the above-described oxygen scavenging anions in the absence of oxygen to yield the subject materials. In the case of bisulfite, this may be accomplished using a solution of sulfur dioxide in water. In yet another method, an appropriate source of trivalent metal (such as aluminum hydroxide) may be reacted, in the absence of oxygen, with an appropriate source of divalent metal (such as magnesium oxide or nickel hydroxide) in the presence of conjugate acids of the above described oxygen scavenging anions to yield the subject materials.

The preferred modified anionic hydrotalcite-like material used to form the oxygen scavenger system of the present invention has magnesium as $M^{II}$. However, the magnesium may be at least partially substituted with a transition metal ion, such as cations selected from nickel, cobalt, zinc, copper, manganese or mixtures thereof. Further, the preferred material has aluminum as $M^{III}$. However, the aluminum may be partially (up to about 50 mole percent) substituted from the family of cations selected from chromium, iron or mixtures thereof.

It is believed, though not meant to be a limitation on the present invention, that the precursor HTLC has the capacity to have the oxygen scavenger anions described above become part of the structure of the HTLC. Because the present oxygen scavenging HTLC has a plate-like structure with a small thickness of about 0.005 to 0.1 microns (typically from 0.02 to 0.06 microns) and an aspect ratio of breadth to thickness of at least about 50 and generally in the range of from 50 to 5000 and typically from 50 to 1000, the major ion exchange occurs on the plate surface. This permits the oxygen scavenger anion to be capable of readily reacting with oxygen in the presence of moisture to provide a desired oxygen scavenger agent. Further, it is believed that the presently modified HTLC reacts with any oxidation by-products (through the hydroxyl group) or the oxidation by-products which may form are adsorbed on or absorbed within the crystal structure of the subject modified HTLC.

The subject oxygen scavenger agent is formed by anion exchange to provide an oxygen scavenger anion containing HTLC as described above. The anion A of the present agent should be at least about 60 mole percent oxygen scavenger anion, with preferably at least about 80 mole percent and most preferably at least about 90 mole percent. Lesser mole percentages may be acceptable where the lower amount still provides sufficient oxygen scavenging activity for a particular application. The exact percentage can be readily determined by one skilled in the art. However, the high degree of anionic sites located on the surface of the HTLC provides the ability to provide an oxygen scavenger of high capacity. Such capacity enables one to achieve extended storage capacity of the resultant packaged product. The amount of oxygen scavenging agent will depend on the anticipated application of the resultant scavenging composition. When large amounts of composition are used to scavenge small volumes of oxygen (such as in can coating applications), the amount of oxygen scavenging agent can be as low as about 0.5 weight percent of the composition and preferably at least 1 weight percent of the composition. In other conventional applications, such as cap liners and the like, where the loading of the particulate in the polymer carrier is low and/or the amount of composition is small, the amount of oxygen scavenging agent should be at least about 2 weight percent, preferably from 2 to 20 weight percent, more preferably from 4 to 15 weight percent based on the weight of the composition. The exact amount of oxygen scavenging agent required for a particular application can be readily determined by the artisan. The present invention provides a means of achieving a wide range of scavenger agent content including high weight percentages.

The oxygen scavenging system of the present invention has been found to provide a high degree of oxygen scavenging activity, rate and capacity when the agent is placed in the presence of oxygen and moisture. Thus, the presently described HTLC system must be maintained in the absence of oxygen during formation and the absence of oxygen or moisture during storage. When the present system is formulated into an oxygen scavenging composition with a carrier, such as a polymeric matrix, the carrier should be able to maintain the system substantially free from moisture to the degree needed to trigger (initiate) a high rate of oxygen scavenging to occur to provide preservation of the packaged goods contemplated.

Although modified HTLC has the ability to scavenge oxygen when used alone, it has been unexpectedly found that the present system comprising modified HTLC and a transition metal ion source provides a composition which has enhanced oxygen scavenging activity and capacity. Thus, the present system and composition are capable of initially removing oxygen within the atmosphere of a container at a high initial rate and has the capacity to remove greater amounts of oxygen per unit of the system than obtainable by compositions which merely contain a modified HTLC. Further, this unexpected enhanced scavenging activity and capacity is provided for by the present system without allowing the initial components of the present system and/or any resultant oxidation by-products migrate into and adversely effect the color, taste, or smell of the articles contained within the resultant container.

The modified HTLC oxygen scavenging component of the present system is used in combination with small amounts of transition metal ions. These ions can be provided by the presence of an inorganic or organic transition metal compound and/or by ion replacement with some $M^{II}$ and/or $M^{III}$ of the HTLC. This admixture or combination has been found to provide a composition having enhanced oxygen scavenging activity and capacity.

It has been unexpectedly found that one can obtain a highly effective oxygen scavenger by combining the above-described modified HTLC with a transition metal compound. The transition metal compound may be in the form of a salt, chelate, complex or compound in which the transition metal is associated with other elements or groups by ionic or covalent bonds.

The transition metals found useful herein are those of the series of metals of the Periodic Table in which the filling of the outermost shell to eight electrons is interrupted to bring the penultimate shell from 8 to 12 or 32 electrons. These elements use both their penultimate shell orbits as well as outermost shell orbits in bonding. Thus, the transition elements include elements of the first transition series of the Periodic Table composed of elements 21 through 29 (Sc, Ti, V, Cr, Mn, Fe, Co, Ni and Cu or mixtures thereof) and, of these, the preferred metals are cobalt, copper, iron, tin, nickel and manganese, or mixtures thereof with copper and cobalt being most preferred. The positive oxidation state of the metal when introduced as part of the system is not necessarily that of the active state which causes enhanced activity and capacity to the system.

Transition metal compounds suitable for providing the presence of the metal ion may be in the form of an organic transition metal complex, chelant or organic carboxylic acid salt. Examples of suitable organic transition metal compounds are:

(1) Metal Salts of mono-, di- and poly-carboxylic acids having a carbon chain length of $C_1$–$C_{20}$ or so. The carbon chain can be aliphatic or aromatic, substituted or unsubstituted, may contain unsaturation or may be a fatty acid. Illustrative examples of such metal salts are:

aliphatic monocarboxylic acids such as, formic, acetic, propionic, butyric, valeric, caproic, caprylic, capric, lauric, tridecanoic, myristic, pentadecanoic acids and the like;

aliphatic dicarboxylic acids such as, oxalic, malonic, succinic, glutaric, adipic, pimelic, azelaic, sebacic acids and the like;

poly-carboxylic acids such as, citric acid and the like;

acids containing unsaturation such as, oleic, linoleic, sorbic, glutaconic, hydromuconic, octenedioic acids and the like;

aromatic acids such as, benzoic, salicylic and the like and may be unsubstituted or substituted;

fatty acids such as, higher carbon monoacids, preferably having the carboxyl group located terminally, for example palmitic, stearic, nonadecanoic acids and the like;

The acid may be substituted with hydrocarbyl groups which may be composed of straight or branched chains, typically an aliphatic group having 1–6 carbon atoms or an aromatic group, for example, cyclohexanebutyric acid and 2-ethylhexanoic acid. Further, the acids may have other substitution groups such as aldehyde or hydroxyl groups, for example, as contained in glyoxylic acid, glycolic acid, or gluconic acid and the like;

(2) Metal Chelate acid/base complexes such as those formed with ethylenediaminetetraacetic acid, phthalocyanine, tetraphenyl porphines and naphthalocyanines, and the like;

(3) Metal Sulfonic acid containing compounds such as p-toluenesulfonic acid and the like;

(4) Metal Ionomer salt in which a polymeric counterion is employed. Such ionomers are well known in the art; or (5) Metal Ligands in which the transition metal is associated with acetylacetonate, benzoylacetonate, 2,2,6,6-tetramethyl-3,5-heptanedionate and the like.

The preferred organic transition metal compounds are, for example, cobalt (II) neodecanoate, cobalt (II) oleate, cobalt (II) 2-ethylhexanoate, copper (II) stearate, copper (II) 2-ethylhexanoate, copper (II) palmitate, copper (II) acetate, copper (II) gluconate, cobalt (II) acetate, iron (II) acetate, iron (III) acetylacetonate, iron (II) gluconate, manganese (II) acetate, nickel (II) 2-ethylhexanoate and the like.

Alternately, the transition metal compound may be in the form of an inorganic transition metal salt. The salt may be a water-soluble or a water-insoluble salt. The salts may be transition metal halides, sulfites, sulfates, sulfides, phosphites, phosphates, pyrophosphates, phosphides, hypophosphites, nitrites, nitrates, oxides, carbonates, hydroxides, chlorates, bromates, chromates, chromites, titanates, borides, perchlorates, tetrafluoroborates, tungstates and the like and mixtures thereof.

Examples of such salts include Copper (I or II) sulfide, Copper (I or II) bromide, Copper (I or II) chloride, Copper (I or III) oxide, Copper (II) carbonate, Copper (II) fluoride, Copper (II) hydroxide, Copper (I or II) iodide, Copper (II) nitrate, Copper (II) nitrite, Copper (II) sulfate, Cobalt (II) bromide, Cobalt (II) carbonate, Cobalt (II) choride, Cobalt (II) hydroxide, Cobalt (II) nitrate, Cobalt (II) sulfate, Cobalt (II or III) oxide, Iron (II or III) bromide, Iron (II or III) chloride, Iron (II or III) fluoride, Iron (III) nitrate, Iron (II or III) oxide, Iron (II or III) perchlorate, Iron (III) phosphate, Iron (II or III) sulfate, Iron (II) sulfide, Manganese (II) bromide, Manganese (II) carbonate, Manganese (II) chloride, Manganese (II, III or IV) oxide, Manganese (II) hypophosphite, Manganese (II) nitrate, Manganese (II) sulfate, Nickel (II) bromide, Nickel (II) chloride, Nickel (II) hyrdoxide, Nickel (II) oxide. The preferred inorganic salts useful in forming the present oxygen scavenger system and composition are copper (II) sulfate, copper (I) chloride, copper (II) chloride, cobalt (II) sulfate, iron (II) chloride, iron (III) chloride, iron (II) sulfate, manganese (II) sulfate, tin (II) sulfate and nickel (II) sulfate.

The term "compound" as used herein and in the appended claims refers, except where specifically indicated otherwise, to materials which have the transition metal in a valence state other than zero and are bound to a counter moiety, such as in a salt, complex, chelate or other form which provides a stable material.

The oxygen scavenging system of the present invention comprise modified HTLC oxygen scavenger and a transition metal ion source. When the transition metal ion source is in the form of an inorganic or organic transition metal compound, as described above, it may be physically mixed with the particulate modified HTLC to provide a substantially uniform mixture of the modified HTLC and transition metal compound. This mixture is uniformly distributed in the carrier to provide the oxygen scavenging composition of the present invention. The physical mixture can be formed by initially mixing the modified HTLC and the transition metal compound and then introducing this mixture into a carrier. Alternately, the modified HTLC and the transition metal compound can be separately mixed with the carrier and then each of the loaded carriers can be mixed together to provide a uniform mixture of the transition metal compound and the modified HTLC in a carrier matrices.

Alternately, the modified HTLC can be coated with the transition metal compound to provide an intimate mixture of the two components forming the oxygen scavenger system of the present invention. As stated above, modified HTLC has a layered structure and, thereby, provides a high surface area which can be at least partially coated with a transition metal compound. This coating can be done by any conventional manner such as by treating modified HTLC with a solution of transition metal compound to the point of incipient wetness and then removing the solvent. The present modified HTLC/transition metal compound system can be an intimate mixture of modified HTLC and transition metal compound in combination with modified HTLC coated with transition metal compound.

Still further, the transition metal compound can be used as a source of transition metal ion which is ion exchanged with a portion of the non-transition metals (e.g., $Ca^{+2}$, $Mg^{+2}$) of the modified HTLC. This can be accomplished by introducing a transition metal compound (preferably as a salt) into the reagents used to form modified HTLC. Alternately, one can contact a previously formed modified HTLC with a solution of a transition metal salt for a period of time and elevated temperature to cause ion exchange to occur (e.g., at least 60 minutes, preferably from 120 to 360 minutes contact time. It is desirable to wash the resultant modified HTLC with water or a water-alcohol mixture to remove the exchanged salt by-product. The resultant product may be composed of modified HTLC which has transition metal compound intimately admixed therewith and/or coated on its surface as well as transition metal ion as part of the modified HTLC.

The aqueous solution used to coat the transition metal compound onto and/or ion-exchange the transition metal ion with the modified HTLC must be free of oxygen. The process should be done in an oxygen free atmosphere. The oxygen scavenging combination of the present invention has been found to provide effective oxygen scavenging activity and rate when the agent is placed in the presence of oxygen and moisture. Thus, the presently described oxygen scavenging compositions of the invention must be maintained in the absence of oxygen during formation and the absence of oxygen or moisture during storage. When the present system is formulated into an oxygen scavenging composition with a carrier, such as a polymeric matrix, the carrier should be able to maintain the agent substantially free from moisture to the degree required to trigger (initiate) a high rate of oxygen scavenging to occur.

The amount of the modified HTLC oxygen scavenging component of the system will depend on the anticipated application of the resultant scavenging composition. When large amounts of composition are used to scavenge small volumes of oxygen (such as might be the case if a relatively thick polymeric coating were used to coat the entire interior surface of a can), the amount of modified HTLC oxygen scavenging component can be as low as about 0.05 weight percent of the composition and preferably at least 1 weight percent of the composition. Generally speaking, the modified HTLCs may be used in the range of 0.05–90% based on total weight of the composition; more preferably 0.5–40%; and most preferably 1.0–25% based on total weight of composition. In some conventional applications, such as cap liners, crown gasket compositions, can sealants, and the like, where the loading of the particulate in the polymer carrier is low and/or the amount of composition is small, the amount of modified hydrotalcite oxygen scavenging component can be at least about 1 weight percent, preferably from 2 to 40 weight percent, and more preferably from 3 to 25 weight percent based on the weight of the composition.

The amount of modified HTLC oxygen scavenging component required for a particular application can be readily determined by the artisan. When the oxygen scavenger particulate is incorporated into a gasket, the amount is normally at least 0.05 weight percent (e.g., 0.05 to 90%) based on the total weight of the composition, generally at least 1% and preferably at least 2% (e.g. 2 to 9%, preferably 2 to 40% and more preferably from 2 to 25%). In the case of a plastisol, lacquer, or hot melt applied to the center panel of a closure, where the carrier does not otherwise serve as a gasket, the amount can be much higher. For example, loadings of 20 to 60 weight percent, or in some cases up to 90 weight percent are workable. When the composition is in the form of a film, mat, pouch or sachet, the oxygen scavenger should be present in an amount to effectively scavenge oxygen during the contemplated storage period of the container for the appropriate contents. An amount of from about 0.01 to 2 grams of scavenging combination will effectively scavenge oxygen of a container of normal size. The present invention provides the ability to achieve a wide range of modified HTLC scavenger agent content including high weight percentages.

The transition metal component described above should be present in the subject composition in mole ratio of modified HTLC to transition metal of the transition metal compound of from about 3000:1 to 1:1 with from 2000:1 to 5:1 being preferred and from 100:1 to 10:1 being most preferred. In certain applications the ratio may be greater or lesser to provide for effective scavenging of oxygen.

Exemplary modified HTLC and transition metal compound suitable for use in the present invention are finely divided solids that are particularly suited to replace part or all of the filler commonly found in sealant, coating, or film compositions which are applications contemplated herein. The particulate size of these components may range from 10 to 500 microns with from 20 to 50 microns being preferred.

The subject composition as a whole is effectively anhydrous, that is, it provides a moisture content lower than needed to trigger (initiate at a substantial rate) oxygen scavenging. Thus, it is preferred that the carrier component of the composition be a polymeric matrix which is also preferably anhydrous. Generally, the polymeric matrix substantially protects the scavenger from moisture under normal atmospheric conditions and, therefore, the oxygen scavenger agent remains substantially inert to scavenging activity. However, once a high degree of moisture is attained, as in a closed package environment of food products, the scavenging activity is initiated or triggered. Moisture ingress into the polymeric matrix carrying the composition is conventionally accelerated by common practices such as hot filling, sterilization, pasteurization, retort and the like. The polymer matrix should be sufficiently permeable to permit moisture and oxygen to pass into the matrix's mass and contact the particulate material.

In one embodiment of the present invention, the carrier of the subject composition comprises a polymeric matrix material, that is to say polymeric material (including optional additives such as plasticizers, fillers, surfactants, etc.) that will form a solid matrix having distributed therein the oxygen scavenging system of the presnt invention. The polymeric matrix carrier should be selected with regard to the nature of the composition (film, dispersion, latex, plastisol, dry blends, solution or melt) and its utilization as part of the container and/or closure in a conventional manner.

The carrier may be chosen from at least one polymeric material that can form a solid, or semi-solid matrix. The polymeric carrier can be derived from a variety of polymers which are available from a variety of bulk physical configurations such as films, dispersion, latex, plastisol, dry blend, solution, or melt (e.g., thermoplastic meltable polymer). The particular physical configuration of the polymer selected will depend on the end structure into which the subject composition is eventually formed or incorporated. The polymeric matrix is derived from polymer types which may be thermoplastic or thermosetting.

The primary functions served by the polymer matrix for purposes of the present invention are to provide a compatible carrier (a material which is stable under normal packaging temperature conditions and does not deactivate the oxygen scavenger activity of the present modified hydrotalcite transition metal ion system) for the oxygen scavenging system which is fully described herein above and to permit ingress of both oxygen and water into the composition under dictated conditions and in a manner which permits them to come in contact with the components of the system. The scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include polyolefins, vinyl polymers, polyethers, polyesters, polyamides, phenol-formaldehyde condensation polymers, polysiloxanes, ionic polymers, polyurethanes, acrylics and naturally occurring polymers such as cellulosics, tannins, polysaccharides, and starches.

Suitable materials for use as the polymeric matrix component of latex compositions, e.g., for can ends, are described in U.S. Pat. Nos. 4,360,120; 4,368,828 and EP 0182674. Suitable polymeric materials for use when the compositions are organic solutions or aqueous dispersions are described in U.S. Pat. Nos. 4,360,120; 4,368,828; and GB 2,084,601. Suitable materials for use in thermoplastic compositions include the materials proposed in U.S. Pat. Nos. 4,619,848; 4,529,740; 5,014,447; 4,698,469; GB 1,112,023; GB 1,112,024; GB 1,112,025 and EP 129309. The teachings of each of the references cited herein above are incorporated herein by reference in their entirety.

In particular, the polymeric carrier can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, ethylene or propylene/carbon monoxide alternating copolymers, vinyl chloride homopolymers and copolymers, vinylidene dichloride polymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

Compositions according to the invention particularly useful to form films and the like may comprise a thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Particularly preferred compositions for use as liners and the like for semi-rigid packages (e.g., cans) are a plastisol or a dry blend of polymer. These may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxyester resins, epoxy resins, polyesters and alkyds. These resins are normally formed into solutions or suspensions with organic liquids and applied to the inner surface of a container followed by application of elevated temperature to remove the liquid and cause solidification (e.g., by crosslinking) of the resin coating on the substrate.

The polymer matrix carrier of the subject composition may be selected from those used to form coatings on at least a portion of the interior surface of a package (e.g., a rigid container such as a can, can lid, box, carton, or the like). The polymer matrix can be selected from polymer classes commonly referred to as epoxides, phenolics (e.g., phenolformaldehyde condensation polymer), lacquers (e.g., cellulose esters or ethers, shellac, alkyl resins and the like), polyurethanes and the like. The carrier matrix may be mixed with the components of the above described oxygen scavenger system to provide encapsulated particulates which may be subsequently used in a second polymer matrix or applied onto (such as by solvent or melt application) the surface of a second carrier material.

Polymeric carriers used to form the composition may further contain conventional plasticizers, including phthalates, adipates, glycols, citrates and epoxidized oils and the like as, for example, dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

In addition, the carriers of the invention may further contain inert filler, slip aids, process aids, pigments, stabilizers, anti-oxidants, tackifying resins, foaming agents and other conventional additives in conventional amounts, depending upon the nature of the composition and its final use.

If the carrier comprises a thermoplastic polymer, the total amount of such additives is generally below 10%, most preferably below 3%, based on the total weight of the composition. However, when the carrier is in the form of a plastisol, dispersion, organic solution or latex, the amounts of additives based on total weight of the composition may be higher. When an anti-oxidant is incorporated, it should be present in amounts capable of stabilizing the polymeric composition against degradation due to free-radicals formed during processing. However, the amount of anti-oxidant should be small enough to permit the subject modified HTLC/transition metal compound oxygen scavenger system of the present composition to effectively react with molecular oxygen. The specific amount will depend on the anti-oxidant used and can be determined by minor experimentation. In certain instances, the amount of filler normally used may be at least partially replaced by the presently required solid particulate modified HTLC oxygen scavenging agent which has been mixed, coated or ion-exchanged with the transition metal compound, as described herein above.

A preferred aspect of the invention is that the oxygen scavenger system should remain substantially inert in the composition and in the gasket or other solid deposit formed with the subject composition until the composition is on or in a sealed container. Exposure of the composition to high humidity that normally exists within a sealed container will, therefore, result in sufficient permeation of moisture into the composition and cause the subject oxygen scavenger system to initiate oxygen scavenging to a high degree. This will result in improved shelf life of the packaged material. In addition, the scavenging reaction can be further accelerated by heating the composition sufficiently while in the closed container to cause increased permeation of moisture. Thus, the oxygen scavenger system will preferably remain substantially inert in the carrier until the scavenging reaction is accelerated by heating in the presence of moisture.

The scavenging reaction of the present composition can be accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject oxygen scavenger system. The moisture becomes trapped in the composition, thereby bringing the scavenger system into contact with sufficient water to permit reaction with the oxygen present. This oxygen may permeate through the composition either from oxygen trapped within the container when it was filled or which subsequently enters the container from the surrounding atmosphere.

While some conventional oxygen scavenging agents degrade when subjected to elevated temperatures, the subject oxygen scavenger system has been found to be stable to elevated temperatures commonly experienced in processing polymers into films or coatings, removing solvents from plastisol compositions, pasteurization, sterilization and the like processes commonly encountered in packaging technology.

The composition of the invention may be formulated in any convenient form, such as a melt extrusion, plastisol, organic solution, dry blend, latex or dispersion. The main ingredients of the composition, apart from the oxygen scavenger system and carrier, are normally typical of those conventionally present for the intended purpose. It is preferred that the total composition should be non-aqueous (i.e., an anhydrous solution, plastisol or thermoplastic melt) so as to prevent initiation of the reaction of the scavenger within the composition.

The subject composition can be utilized to form a film which carries the present oxygen scavenger system. The carrier can be formed from a polymeric material, such as those described herein above, capable of forming a film and upon the surface thereof is deposited the present oxygen scavenger composition. The film may be composed of a single layer or of a plurality of layers. The surface of the film can be coated with the subject oxygen scavenger composition by forming a suspension or dispersion of the particulates in a polymer and depositing the suspension or dispersion by a conventional means, such as spraying or knife coating application or the like, directly onto the surface of the carrier film. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain the cmponents of the oxygen scavenger system within the interstices of the mat structure during use. The scavenger can be deposited into the mat structure by any means such as by dipping the mat into a dispersion or suspension of the scavenger system and then removing the liquid from the mat or by first forming particulates of scavenger/polymer composition which is melt deposited onto and into the mat structure.

In another embodiment, the subject oxygen scavenger system can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger composition is thus composed of the pouch or sachet carrier having therein the oxygen scavenger system, per se, or contained in a polymer matrix and provided for in the form of small particles of sufficient particulate size to permit the sachet structure to retain the particulate therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the present oxygen scavenger system distributed therein. The ceramic can be formed into any desired shape (e.g., spheres, cubes, cylinders and the like) and size which is suitable for insertion into the container having the oxygen sensitive material. Useful porous inorganic materials include conventional clay, cement pastes and the like.

It has been found that the above described oxygen scavenger compositions can be used for the preservation of oxygen sensitive foods stored at ambient conditions. The present compositions have an advantage over those compositions having oxygen scavengers directly mixed into and forming a filler of a polymer matrix because the present compositions inhibit the release of scavenger agent and/or oxidation by-products which may contaminate the food material. The oxygen scavenger system of the present invention is composed of particulate material that contains, as a part of its structure, a moisture-triggerable oxygen scavenging moiety. It has been found that the nature of the system is such that the oxygen scavenging moiety is highly reactive with molecular oxygen yet is bound to the hydrotalcite in a manner which substantially prevents migration of the oxygen scavenging moiety or its oxidized product into the packaged material. Therefore, the present invention unexpectedly provides a highly desired oxygen scavenger composition which does not cause discoloration or detract from taste of the packaged food product.

The amount of the subject oxygen scavenger agent containing particulate is dependent on the type of application. When the particulate is incorporated into a gasket, the amount is normally at least 0.5 weight percent based on the polymeric matrix material, generally at least 1% and preferably at least 2%. It is generally unnecessary for the amount to be above 20% and 4%–10% is often a convenient maximum.

In the case of a plastisol, lacquer, or hot melt applied to the center panel of a closure, where the matrix does not otherwise serve as a gasket, scavenger particulate loadings can be much higher. For example, loadings of 20 weight percent to 60%, or in some cases up to 90% are workable.

When the composition is in the form of a film, mat, pouch or sachet, the oxygen scavenger should be present in an amount to effectively scavenge oxygen during the contemplated storage period of the container for the appropriate contents. An amount in the range of from 0.01 to 2 grams of the oxygen scavenging agent having at least about 60 mole percent oxygen scavenging anion A is normally sufficient to provide desired oxygen scavenging capacity in a normal size (50–1000 ml) container.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end) or as an insert in the form of a film, mat, pouch, sachet or ceramic structure.

The composition of the invention in the form of a film can, for example, be laminated to paperboard to form gable-top cartons. The film may further comprise oxygen barrier layers and/or heat sealable layers.

The invention formed with a polymer carrier in the form of a film can be applied as a center panel lining on a container closure. The closure can be a cap, can end, lid stock or film. The invention also includes container closures carrying a solid deposit formed on the closure from a polymer matrix or film composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the packaged material that is contained within the container body. The container body is preferably of glass or metal. The closure is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging composition is typically not used in the gasket composition because, under typical can seaming conditions, the gasket is not substantially exposed to oxygen in the pack. Also, the seams are not particularly vulnerable to oxygen ingress. The oxygen scavenging composition is typically applied on a center panel or other interior surface in the can, such as applied as a coating of a can.

It is particularly preferred that the gasket or coating on the container closure be formed by applying a fluid or molten composition of the present invention formed with a fluid polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness. For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal pane. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or laminated to the interior liner of the cardboard package, along a line of weakness at the package closure, or at any other convenient location in the package. Alternately, the present composition can be placed within the container as a film, mat or sachet.

Further, the composition of the present invention can be compounded and extruded, injection molded or thermoformed into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multi-layer film, the layer formed of the present composition may be the surface layer which will be exposed to the inner surface of the resultant flexible package or an inner layer which is covered by a surface layer having sufficient permeability to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The compositions can also be used in conjunction with or as a portion of a tamper-evident membrane for pharmaceuticals and foods.

The following examples are given for illustrative purposes only and are not meant to be a limitation on the teaching herein or on the claims appended hereto. All parts and percentages are by weight unless otherwise stated.

To test for oxygen scavenging capability, each sample was tested in triplicate by being placed in gas impermeable, vacuum sealed containers fitted with a septum to allow gas to be introduced and gas samples removed for periodic analysis. Containers having a sample were injected with 100 cc of room air (ca. 20.6% $O_2$) and pasteurized at 60° C. for 45 minutes and then stored in the dark to avoid photo-oxidation. The headspace oxygen concentration was measured at regular intervals by withdrawing samples which were then analyzed using a MOCON® Model HS-750 Headspace Oxygen Analyzer. All samples were prepared and tested in triplicate and the data was averaged to obtain the reported values.

EXAMPLE I

Preparation of bisulfite-functional hydrotalcite

Under a nitrogen atmosphere, 45 parts of sodium bisulfite were dissolved in 255 parts deionized water which had previously been purged with argon. To this solution were added 20 parts of an uncalcined, carbonate-functional hydrotalcite with a Mg/Al ratio of 1.0 ($[Mg_{.5}Al_{.5}(OH)_2](CO_3)_{.25} \cdot xH_2O$) (from Alcoa, HTC-10L). The slurry was stirred for 1 hour under argon with heating to about 60° C. The solids were then collected via vacuum filtration under an argon atmosphere and washed with 600 parts deoxygenated, nitrogen-purged water. The solids were then taken up in 300 parts argon purged water and stirred for 1 hour before again filtering and washing with 1500 parts nitrogen-purged water. The product was dried in a vacuum oven at 80° C. for 6 hours to yield a fine white powder. This product was labeled "HTLC/Bisulfite I".

EXAMPLE II

A series of samples were made by introducing 0.2 part of HTLC/Bisulfite I of Example 1 into 3"by 4" gas impermeable pouches followed by the addition of a transition metal salt in the amount indicated in Table 1 below (all salt additions were equimolar in metal ion). The pouches were fitted with septa and heat sealed under vacuum. To each pouch 0.2 part water followed by 100 cc of air were introduced via the septa. The oxygen content of each pouch was measured at regular intervals thereafter by withdrawing 3 cc samples of the atmosphere in the pouches via gas syringe and injecting into a MOCON® model HS 750 Headspace $O_2$ Analyzer. Samples without added water were also monitored to test stability in air; these dry samples showed no significant scavenging.

TABLE 1

Soluble Transition Metal Catalysts

| Run | DESCRIPTION | Salt Amount (g) | Oxygen Scavenging | | |
| --- | --- | --- | --- | --- | --- |
| | | | 1 hr. $\mu$ mol/g | 1 day $\mu$ mol/g | 7 days $\mu$ mol/g |
| Control | HTLC Bisulfite I | — | 313 ± 0 | 616 ± 61 | 616 ± 62 |
| 1 | Manganese (II) Sulfate Monohydrate | 0.011 | 313 ± 45 | 659 ± 44 | 715 ± 25 |
| 2 | Iron (II) Sulfate Heptahydrate | 0.018 | 372 ± 26 | 682 ± 66 | 766 ± 45 |
| 3 | Iron (III) Sulfate Pentahydrate[1] | 0.032 | 469 ± 22 | 721 ± 77 | 760 ± 80 |
| 4 | Iron (II) Chloride Tetrahydrate | 0.013 | 290 ± 67 | 759 ± 63 | 850 ± 58 |
| 5 | Iron (III) Chloride Hexahydrate | 0.017 | 417 ± 13 | 640 ± 38 | 703 ± 43 |
| 6 | Nickel (II) Sulfate Hexahydrate | 0.017 | 298 ± 47 | 687 ± 55 | 771 ± 70 |
| 7 | Copper (II) Sulfate Pentahydrate | 0.016 | 253 ± 100 | 549 ± 60 | 787 ± 34 |
| 8 | Copper (I) Chloride | 0.006 | 413 ± 16 | 727 ± 30 | 769 ± nd |

[1]Double the molar amount of metal ion was used

The above data shows that the presence of transition metal salt increased the oxygen activity and capacity of the anionic hydrotalcite to provide improved oxygen scavenging systems.

EXAMPLE III

A series of samples were made in which a portion of the magnesium ions of the hydrotalcite was ion exchanged with transition metal ions to produce a transition metal ion rich anionic HTLC.

Under a nitrogen atmosphere, 1 part of a transition metal salt was introduced into 85 parts deionized, argon purged water and stirred until dissolved. To this solution 20 parts of an uncalcined carbonate-functional hydrotalcite (Mg/Al ratio of 1.0; $[Mg_{0.5}Al_{0.5}(OH)_2](CO_3)_{.25} \cdot H_2O$) (HTC-10 Alcon) was added and the slurry was heated to 95° C. for one hour while stirring under argon. The slurry was allowed to cool to 40° C. and then 15 parts of sodium bisulfite was added to the slurry. The slurry was again heated to 95° C. and maintained at that temperature for one hour. The slurry was then allowed to cool to room temperature. The slurry was vacuum filtered under a nitrogen atmosphere and washed with 500 parts of nitrogen purged water to remove magnesium salt by-product. The resultant moist solid was dried in a vacuum oven at 80° C. for about 6 hours. Table 2 below provides the identity and amount of transition metal salt used, the ion exchanged product yield, and the amount of transition metal (of the respective salt) and the sulfur (of the bisulfite) analyzed by ICP.

TABLE 2

ICP Analysis

| Description | Tran. Metal Salt Used Part | HTLC/ Bisulfite Trans. Metal Ion Product Parts | Trans. Metal (Wt %) | S (Wt %) |
|---|---|---|---|---|
| Manganese (II) Sulfate Monohydrate | 1 | 17.4 | 1.17 ± 0.07 | 4.6 ± 0.4 |
| Iron (II) Sulfate Heptahydrate | 1 | 17.9 | 0.70 ± 0.03 | 4.6 ± 0.02 |
| Iron (III) Sulfate Pentahydrate | 1 | 17.0 | 0.137 ± 0.003 | 4.75 ± 0.09 |
| Iron (II) Chloride Tetrahydrate | 1 | 17.4 | 0.97 ± 0.02 | 4.9 ± 0.1 |
| Iron (III) Chloride Hexahydrate | 1 | — | 0.136 ± 0.003 | 4.64 ± 0.09 |
| Nickel (II) Sulfate Hexahydrate | 1 | 17.4 | 1.10 ± 0.02 | 4.8 ± 0.1 |
| Copper (II) Sulfate Pentahydrate | 1 | — | 1.21 ± 0.02 | 5.4 ± 0.1 |
| Copper (I) Chloride | 1 | 21.1 | 2.68 ± 0.05 | 7.7 ± 0.2 |
| Copper (II) Chloride dihydrate | 1 | 18.6 | 1.69 ± 0.03 | 5.4 ± 0.1 |
| Tin (II) Sulfate | 1 | 18.4 | 1.70 ± 0.03 | 4.73 ± 0.09 |
| Cobalt (II) Sulfate Hydrate[1] | 2.4 | 227 | 1.01 ± 0.02 | 7.6 ± 0.2 |

[1]HTC-10 used in 240 parts/Sodium Bisulfite used in 180 parts.

EXAMPLE IV

Preparation of bisulfite-functional hydrotalcite

Under a nitrogen atmosphere, 90 parts of sodium bisulfite were dissolved in 510 parts deionized water which had previously been purged of oxygen with nitrogen. To this solution were added 100 parts of uncalcined HTLC acetate, having a sheet-like morphology and the formula $[Mg_{.75}Al_{.25}(OH)_2](O_2CCH_3)_{.25} \cdot xH_2O$ (obtained from LaRoche Industries, Inc.). The slurry was stirred for 1 hour under nitrogen, and then the solids were collected via vacuum filtration under a nitrogen atmosphere. The material was taken up in 600 parts nitrogen-purged deionized water and stirred for 1 hour. The solids were again collected via vacuum filtration and washed with 6000 parts nitrogen-purged water. The material was dried for 9 hours at 80° C. in a vacuum oven to yield approximately 60 parts of a fine white powder labeled HTLC/Bisulfite II.

A series of oxygen scavenging systems were prepared from the above HTLC/Bisulfite II by forming a physical mixture of the HTLC/Bisulfite II with a cobalt compound in amounts indicated in Table III. The amount utilized was based on the amount required to react with 20.6 cc oxygen in the test pouches. In each case where the transition metal is part of the formed oxygen scavenging system, the oxygen was rapidly consumed within the first hour of testing. The results are given in Table III below.

TABLE 3

Soluble Co(II) Catalysis of Hydrotalcite (Bi)sulfite Oxidation

| Run | DESCRIPTION | % of 1 week Capacity @ 1 hour | % of 1 week Capacity @ 1 day | CAPACITY @ 1 week (mL $O_2$/g) |
|---|---|---|---|---|
| Control | HTLC/Bisulfite II | 23 | 95 | 31.0 |
| 1 | Sheet-like HTLC/Bisulfite II + 5% $CoSO_4$ | 91 | 98 | 34.7 |
| 2 | Sheet-like HTLC/Bisulfite II + 0.5% $CoSO_4$ | 84 | 96 | 30.1 |
| 3 | Sheet-like HTLC/Bisulfite II + 5% Vit. $B_{12}$ | 73 | 99 | 31.1 |

EXAMPLE V

Co:Al sheet-like hydrotalcite exchanged with bisulfite

Example 6 from U.S. Pat. No. 5,518,704 (Aristech Chemical Corporation) was modified as follows. 15.13 g pseudobohmite (Versal 700, LaRoche) and 13.7 g acetic acid were slurried in 500 mL water in a 3 L flask fitted with a condenser and then heated to 55° C. for 30 min. with stirring. 40.9 g $Co(OH)_2$ were added to the slurry followed by 1.5 L nitrogen-purged water. The mixture was heated to 90° C. for 6 h. under argon and then allowed to cool to ambient temperature. The slurry was extremely difficult to vacuum filter and so was rotary evaporated at 60° C. to a thick sludge. A portion of this was partially dried in a vacuum oven at 80° C. 25 g of this crude product was placed in an argon-purged solution of 22.5 g sodium metabisulfite in 127.5 g water and stirred overnight. The slurry was vacuum filtered, rinsed with 1 L water, and dried in a vacuum oven at 80° C. for 6 h. to yield 2.5 g of a purple powder.

EXAMPLE VI

Mg:Al:Co sheet-like hydrotalcite exchanged with bisulfite 7.75 g pseudobohmite (Versal 700, LaRoche) and 6.85 g acetic acid were slurried in 500 mL water in a 3 L flask fitted with a condenser and then heated to 55° C. for 30 min. with stirring. 8.41 g $Mg(OH)_2$ (MagChem—325, Martin Magnesia Specialties) and 1.02 g $Co(OH)_2$ were added to the slurry followed by 750 mL nitrogen-purged water. The mixture was heated to 90° C. for 6 h. under argon and then allowed to cool to 40° C. 36.0 g sodium bisulfite were added and stirred for 1 h. After sitting overnight the slurry had partially settled. It was easily vacuum filtered and washed with 2 L water. The yield of purplish powder after drying in the vacuum oven at 80° C. for 6 h. was 19.4 g.

EXAMPLE VII

The ion exchanged samples of Examples V and VI were tested for capacity to absorb oxygen according to the procedure of Example IV above. The results showed very rapid scavenging of oxygen by the ion exchanged materials as shown in Table IV below.

TABLE 4

Co(II)-Containing Hydrotalcite Bisulfites with Sheet-like Morphology

| DESCRIPTION | % of 1 week Capacity @ 1 hour | % of 1 week Capacity @ 1 day | CAPACITY @ 1 week (mL O$_2$/g) |
|---|---|---|---|
| Co:Al Sheet-like Hydrotalcite Bisulfite | 96 | 100 | 38.8 |
| Mg:Co:Al Sheet-like Hydrotalcite Bisulfite | 97 | 100 | 21.9 |

In the claims:

1. An oxygen scavenger composition comprising a carrier having substantially uniformly distributed therein a combination of a hydrotalcite-like material and a transition metal compound, said hydrotalcite-like material being present in from 0.05 to 90 weight percent of said composition and represented by the formula:

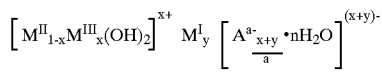

$$\left[ M^{II}_{1-x}M^{III}_{x}(OH)_2 \right]^{x+} M^{I}_{y} \left[ A^{a-}_{\frac{x+y}{a}} \cdot nH_2O \right]^{(x+y)-}$$

wherein $M^I$ represents an alkali metal' selected from sodium or potassium; $M^{II}$ represents magnesium, zinc, nickel, copper, cobalt and mixtures thereof; $M^{III}$ represents aluminum, chromium, iron and mixtures thereof; A represents an anion, at least 60 mole percent of said anion composed of oxygen scavenger anion selected from bisulfite, dithionite, ascorbate, thiolate, phenolate or mixtures thereof; x is a numerical value of from about 0.1 to 0.5; a is an average numerical value of the valence of A; y represents 0 when "a" is less than 2 and a value of from 0 to 0.5 when "a" is at least 2; and n is a numerical value of from 0 to 4;

and said transition metal compound is present in an amount such that the molar ratio of said hydrotalcite-like material to transition metal is from 3000:1 to 1:1.

2. The composition of claim 1 wherein said transition metal compound has a transition metal selected from Sc, Ti, V, Cr, Mn, Fe, Co, Ni, Sn, Cu or mixtures thereof.

3. The composition of claim 2 wherein the transition metal is selected from Co, Cu, Fe or mixtures thereof.

4. The composition of claim 1 wherein the oxygen scavenger anion A is selected from ascorbate anion, thiolate anion, phenolate anion or mixtures thereof.

5. The composition of claim 2 wherein the oxygen scavenger anion A is selected from ascorbate anion, thiolate anion, phenolate anion or mixtures thereof.

6. The composition of claim 1 wherein the oxygen scavenger anion A is bisulfite, dithionate or mixtures thereof.

7. The composition of claim 2 wherein the oxygen scavenger anion A is bisulfite, dithionate or mixtures thereof.

8. The composition of claim 4 wherein the oxygen scavenger anion A is ascorbate anion.

9. The composition of claim 5 wherein the oxygen scavenger anion A is ascorbate anion.

10. The composition of claim 1 wherein the carrier is a thermoplastic resin selected from the group consisting of polyethylene, ethylene/vinyl acetate copolymers, vinyl chloride homopolymers, vinyl chloride copolymers and blends thereof.

11. The composition of claim 5 wherein the carrier is a thermoplastic resin selected from the group consisting of polyethylene, ethylene/vinyl acetate copolymers, vinyl chloride homopolymers, vinyl chloride copolymers and blends thereof.

12. The composition of claim 7 wherein the carrier is a thermoplastic resin selected from the group consisting of polyethylene, ethylene/vinyl acetate copolymers, vinyl chloride homopolymers, vinyl chloride copolymers and blends thereof.

13. The composition of claim 1 wherein the carrier is a polymer matrix comprising polyethylene selected from the group consisting of high, low, very low, ultra low, and linear low density polyethylenes, blends thereof and blends of said polyethylene with other polymers.

14. The composition of claim 1 wherein the carrier is a polymer matrix comprising a mixture of at least one polyethylene and at least one ethylene/vinyl acetate copolymer.

15. The composition of claim 1 wherein the carrier is a polymer matrix comprising a polymer selected from the group consisting of polyolefin, ethylene/vinyl acetate copolymer, butyl rubber, styrene/butadiene rubber, styrene/butadiene/styrene block copolymers, isoprene, styrene/isoprene/styrene block copolymers styrene/ethylene/butylene/styrene block copolymers, and mixtures thereof.

16. The composition of claim 1 wherein the carrier is a polymeric matrix comprising an epoxide, phenolic, polyurethane, polyvinyl chloride homopolymer, polyvinyl chloride copolymers and mixtures thereof.

17. A product that is a container having an interior cavity suitable to contain an oxygen sensitive material which has, as at least part of said container and exposed to the interior of said container, the composition of claim 1.

18. A product that is a container having an interior cavity suitable to contain an oxygen sensitive material which has, as at least part of said container and exposed to the interior of said container, the composition of claim 2.

19. A product that is a container having an interior cavity suitable to contain an oxygen sensitive material which has, as at least part of said container and exposed to the interior of said container, the composition of claim 5.

20. A product that is a container having an interior cavity suitable to contain an oxygen sensitive material which has, as at least part of said container and exposed to the interior of said container, the composition of claim 7.

* * * * *